(12) United States Patent
Burge et al.

(10) Patent No.: US 8,099,266 B2
(45) Date of Patent: Jan. 17, 2012

(54) METHOD AND SYSTEM FOR THE DESIGN OF AN OIL WELL

(75) Inventors: Philip Michael Burge, Westhill (GB); Mufutau B. Oyeneyin, Edinburgh (GB)

(73) Assignee: Drilling Systems Ltd, Dorset (GB)

(*) Notice: Subject to any disclaimer, the term of this patent is extended or adjusted under 35 U.S.C. 154(b) by 922 days.

(21) Appl. No.: 11/661,818

(22) PCT Filed: Sep. 2, 2005

(86) PCT No.: PCT/GB2005/003398
§ 371 (c)(1),
(2), (4) Date: May 7, 2008

(87) PCT Pub. No.: WO2006/024865
PCT Pub. Date: Mar. 9, 2006

(65) Prior Publication Data
US 2008/0289875 A1    Nov. 27, 2008

(30) Foreign Application Priority Data
Sep. 3, 2004  (GB) .................................. 0419588.9

(51) Int. Cl.
*G06G 7/48* (2006.01)
(52) U.S. Cl. ........................................... 703/10; 700/28
(58) Field of Classification Search ................. 703/1, 10
See application file for complete search history.

(56) References Cited

U.S. PATENT DOCUMENTS

| 4,794,534 | A | 12/1988 | Millheim |
|---|---|---|---|
| 6,236,894 | B1 * | 5/2001 | Stoisits et al. ................... 700/28 |
| 6,612,382 | B2 * | 9/2003 | King ............................. 175/40 |
| 6,775,578 | B2 * | 8/2004 | Couet et al. ..................... 700/28 |
| 7,181,380 | B2 * | 2/2007 | Dusterhoft et al. ............. 703/10 |
| 7,512,543 | B2 * | 3/2009 | Raghuraman et al. ....... 705/7.28 |
| 7,627,461 | B2 * | 12/2009 | Guyaguler et al. ............. 703/10 |
| 7,835,893 | B2 * | 11/2010 | Cullick et al. .................... 703/6 |
| 2001/0042642 | A1 | 11/2001 | King |
| 2002/0177955 | A1 | 11/2002 | Jalali et al. |
| 2003/0168257 | A1 | 9/2003 | Aldred et al. |
| 2004/0000430 | A1 | 1/2004 | King |

(Continued)

FOREIGN PATENT DOCUMENTS
WO    WO-03/072907 A1    9/2003

OTHER PUBLICATIONS

Regtien et al, "Interactive Reservoir Simulation", SPE 29146, 13th SPE Symposium on Reservoir Simulation, Feb. 12-15, 1995.*

(Continued)

*Primary Examiner* — Mary C Jacob
(74) *Attorney, Agent, or Firm* — Michael Best & Friedrich LLP

(57) ABSTRACT

The invention is concerned with the design of oil wells by defining a number of design parameters, some of which are interdependent. The invention makes use of successive optimizations. Input data are selected for a first parameter and varied to achieve a first optimization. The process is repeated for a second parameter whose input data includes the first parameter, and then repeated for each other of the defined parameters. The design parameters may be presented to the user via a graphical interface such as a virtual reality view.

9 Claims, 4 Drawing Sheets

U.S. PATENT DOCUMENTS

2004/0211596 A1* 10/2004 Huang .................. 175/38
2004/0230413 A1* 11/2004 Chen .................. 703/10

OTHER PUBLICATIONS

Gruchalla, Kenny, "Immersive Well Path Planning: The Added Value of Interactive Immersive Visualization", Thesis, Department of Computer Science, University of Colorado, 2003.*

Carroll et al, "Multivariate Optimization of Production Systems", JPT, Jul. 1992, pp. 782-831.*

Pan et al, "Improved Methods for Multivariate Optimization of Field Development Scheduling and Well Placement Design", SPE 49055, 1998.*

Queipo et al, "A Model for the Integrated Optimization of Oil Production Systems", Engineering with Computers (2003) 19:130-141.*

Fujii et al, "Mutlivariate Optimization of Networked Production Systems", SPE Production and Facilities, Aug. 1995.*

Saputelli et al, "Self-Learning Reservoir Management", SPE 84064, SPE Annual Technical Conference and Exhibition, Oct. 5-8, 2003.*

The International Search Report dated Dec. 21, 2005.

* cited by examiner

METHOD AND SYSTEM FOR THE DESIGN OF AN OIL WELL

CROSS-REFERENCE TO RELATED APPLICATION

This application is the U.S. national phase, pursuant to 35 U.S.C. §371, of international application No. PCT/GB2005/003398, published in English on Mar. 9, 2006 as international publication No. WO 2006/024865 A1, which claims the benefit of British application Ser. No. GB 0419588.9, filed Sep. 3, 2004, the disclosure of which applications are incorporated herein in their entireties by this reference.

BACKGROUND OF THE INVENTION

This invention relates to systems and methods for use in designing oil wells and in controlling the drilling of oil wells.

The design of an oil well requires a number of activities. In a typical example, these are:
1. Design well path—being the path the well will take from the surface to and through the reservoir.
2. Design casing scheme—being the placement, size and material characteristics of the casing cemented in the well.
3. Design drill string—being the design of the drill string, bottom hole assembly and drill bit selection for each section of the well.
4. Torque and drag calculations—being the calculation of static and dynamic frictional drag in the well bore due to the movement of the casing and/or drill string during rotary operations.
5. Drilling fluid design—being the design of the drilling fluid and determination of rheological properties.
6. Hydraulics design—being the design of the drilling fluid, flow rate, flow regime and pressure regime along the drillstring, through the bit and along the annulus.
7. Pressure management—being the management of the pressure in the wellbore and the balance between the wellbore pressure, formation fluid pressure and formation fracture pressure.

Ideally, each of these steps would be optimised against known constraints or conditions, which may include subsequent constraints or conditions arising from the output of later steps in the process. Thus, some degree of iteration between steps is necessary.

Current practice is to complete each step individually using manual data input or data selected from a database. Each step is completed before going onto the next step. Each step is completed when certain satisfying conditions are met. These satisfying conditions might not be the optimum solution either for the step under consideration or in terms of the total well design after all the steps have been completed. Any contradictions between the output from a later step and a former step are resolved by returning to the former step to find an alternative solution that satisfies the desired condition. The end result is a set of conditions that have been satisfied and not an optimum solution. For example, step A is completed and the output meets set criteria. Data from step A is entered along with other data into step B. If the output from step B meets set criteria, both step A and step B are said to be optimised. This, however, is not the case; they can only truly be said to satisfy certain conditions, which is not an optimum. An optimum will be reached when the sets of conditions for both step A and step B are optimised.

SUMMARY

One aspect of the present invention is directed to improving this prior art by using concurrent or recursive iterations to provide the best overall optimisation within the defined conditions and constraints.

The use of multiple and inter-related optimisations can cause problems to the well designer owing to the quantity of factors to be assimilated. Another aspect of the invention relates to assisting the designer in this area by conducting the design process within a graphical user interface.

A further aspect of the invention makes use of the same principles in controlling the physical drilling/casing process.

U.S. Pat. No. 4,794,534 describes a method of simulating future drilling activities utilising drilling data as recorded at the rig site. The data is called into use by the operator if there is a perceived variance between the planned and actual drilling operations. The assumption within the text of this patent is that each aspect of well design requires its own simulator.

This document acknowledges that the initial well design process and the real time simulation of future drilling activities are not related activities.

The description clearly states that the real time simulator would be used in the event that a discrepancy is noticed between actual and planned operations. The assumption here is that the planned operations are optimum and any non variance means that the operation is continuing in an optimum way.

U.S. Pat. No. 6,612,382 describes an iterative drilling simulation method and system for enhanced economic decision making. The patent describes a method of determining drill bit performance given certain rig and geological characteristics. This document is only concerned with bit selection and operation.

Accordingly, from one aspect the present invention provides a method of designing an oil well, comprising:
(a) defining a plurality of design parameters each of which is determined by a number of input data, the input data for at least some of the parameters including one or more of the other parameters;
(b) providing, for each of the design parameters, conditions or constraints which must be met;
(c) selecting input data for a first design parameter such that the parameter falls within the conditions or constraints;
(d) varying the input data for the first design parameter to achieve an initial optimisation of the parameter;
(e) for a second design parameter whose input data includes the first parameter, selecting other input data such that the second parameter falls within the conditions or constraints;
(f) varying said other input data for the second design parameter to achieve an initial optimisation of the parameter;
(g) varying the input data for the first parameter to further optimise the second parameter; and
(h) repeating steps (e) to (g) for the remaining design parameters.

The design parameters will typically be selected from activities 1. to 7. above.

The first aspect of the invention also provides a system for use in oil well design, comprising:
a database storing a plurality of design parameters each of which is determined by a number of input data, the input data for at least some of the parameters including one or more other parameters;
the database also storing for each parameter conditions or constraints which must be met;

means for selecting input data for each of the parameters;
calculating means for calculating a selected parameter from its input data; and
means for optimising a given parameter by altering the input data of another parameter which forms an input to said given parameter.

The means for selecting input data may comprise a manual input device such as a keyboard, or may comprise an input data database from which items may be selected by a user.

From another aspect, the present invention provides an oil well design system in which design parameters are presented to a user via a graphical user interface, preferably the graphical user interface comprises a virtual reality interface or view. The system is preferably in accordance with the first aspect of the invention. The graphical user interface is preferably adapted to display the degree of system optimisation, for example by a system of traffic light displays or through any other visual indicator.

A further aspect of the invention resides in a method of forming an oil well in which a model of the predicted wellbore conditions is constructed; real time data is generated by sensors in the well and the drilling rig; said real time data is used to compare the actual with the predicted conditions and differences are used to adjust drilling parameters or to adjust the model; an updated model is created; and the process is repeated as necessary.

The model may be constructed using the design method or system defined above.

BRIEF DESCRIPTION OF THE DRAWINGS

Embodiments of the invention will now be described, by way of example only, with reference to the drawings, in which.

DETAILED DESCRIPTION OF PREFERRED EMBODIMENTS

Well design comprises a number of activities including, but not limited, items 1-7 listed above.

Each of steps 1-7 are optimised against known constraints or conditions which may include subsequent constraints or conditions arising from the output of later steps in the process thus necessitating some degree of iteration between steps.

The current state of the art is to complete each of steps 1-7 independently using manual data input or data selected from a shared database input into each subsequent step in the operation.

Figure 1:
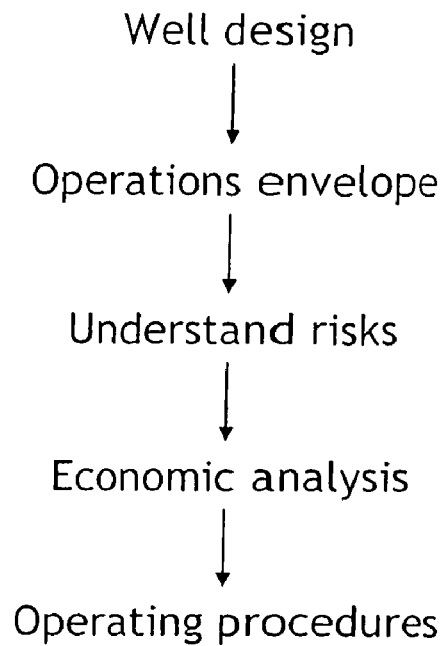
FIG. 1 is an overview of a well design process.

The present invention provides a way of designing the well whereby the iterations are completed concurrently and not sequentially and where the input/output is performed through a single graphical user interface (GUI). The process as described will allow a well engineer or well engineering team to design a well, determine the operations envelope, understand the risks and prepare operating procedures to mitigate the risks. This is demonstrated in FIG. 1.

Figure 2:
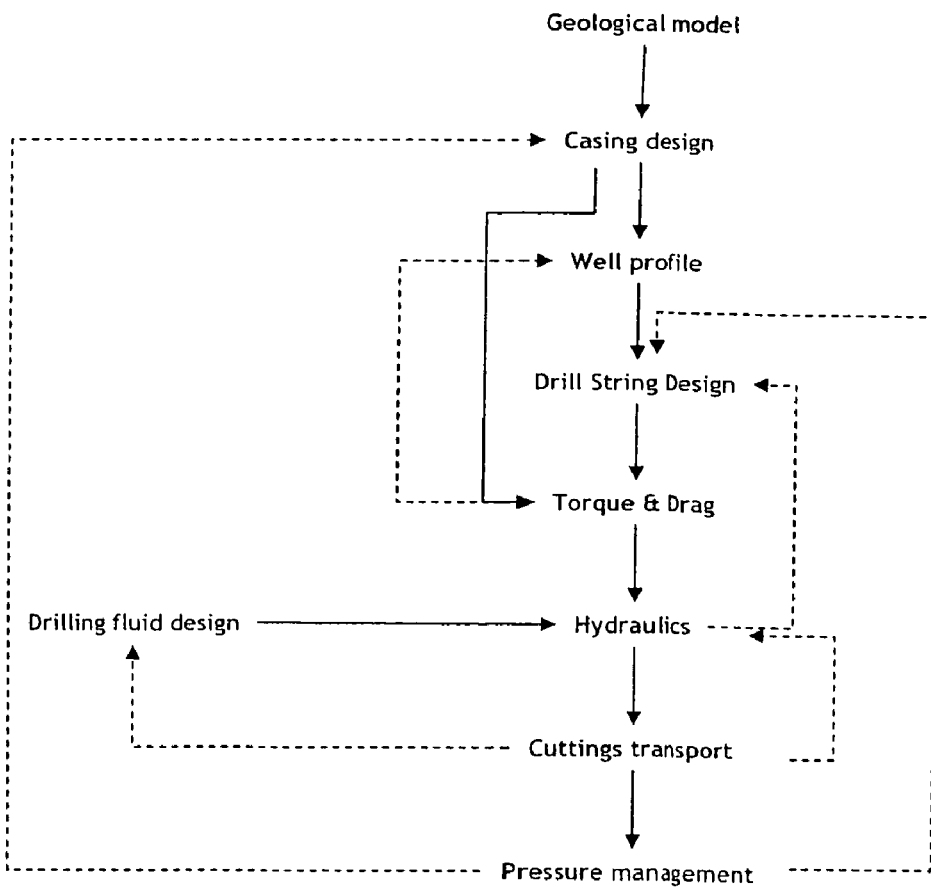
FIG. 2 is a detailed flowchart of one example of well design method.

FIG. 2 represents the new well design model showing some of the iteration steps in the process. From the diagram it can be seen that there are numerous iterations requiring data entry from various steps in the process.

Hitherto, practice has been for each step of the process to be completed before going onto the next step. Each step is completed when certain satisfying conditions are met. These satisfying conditions might not be the optimum solution either for the step under consideration or in terms of the total well design after all the steps have been completed. For instance, step A is completed and the output meets set criteria. Data from step A is entered along with other data into step B. If the output from step B meets the set criteria both Step A and B are said to be optimised. This is not the case and they can be said to satisfy certain conditions only which is not an optimum. An optimum will be reached when both sets of conditions/criteria or constraints in step A and step B are optimised.

The more numerous the number of steps in the process the more sets of conditions or constraints need to be met. It is also common practice to add constraints due to non engineering factors such as logistics and supply of material. If these sorts of constraints are invoked at the start of the well design process a true optimum condition cannot be realised and a true understanding of the operational risks cannot be appreciated. A system whereby all or at least a far larger combination of inputs can be tested will lead to a better well design solution.

One example of a set of activities, constraints and iterations is given in Table 1.

The difficulty of such a broad iterative methodology can be reduced by the use of interactive visualisation in place of the conventional graphs and static line drawings.

The user interface of the proposed system is a 2-D or 3-D "virtual reality" environment that allows the user to manipulate the environment and change conditions within the environment and to see the effects of such changes on all aspects of the well design. In this way a series of adjustments, of say drill string outside diameter can be quickly tested against hydraulics, torque and drag, drilling tendency and so on. A true optimum condition can be determined very quickly. The system can be likened to parametric visualisation.

As an example we can consider the case of modelling wellbore conditions in an underbalanced well.

The conventional method would be to develop a static model assuming an end condition, that is the final depth of the well. A static representation of data such as pressure profile and flow regime under certain flow rate conditions is provided.

Figure 3:
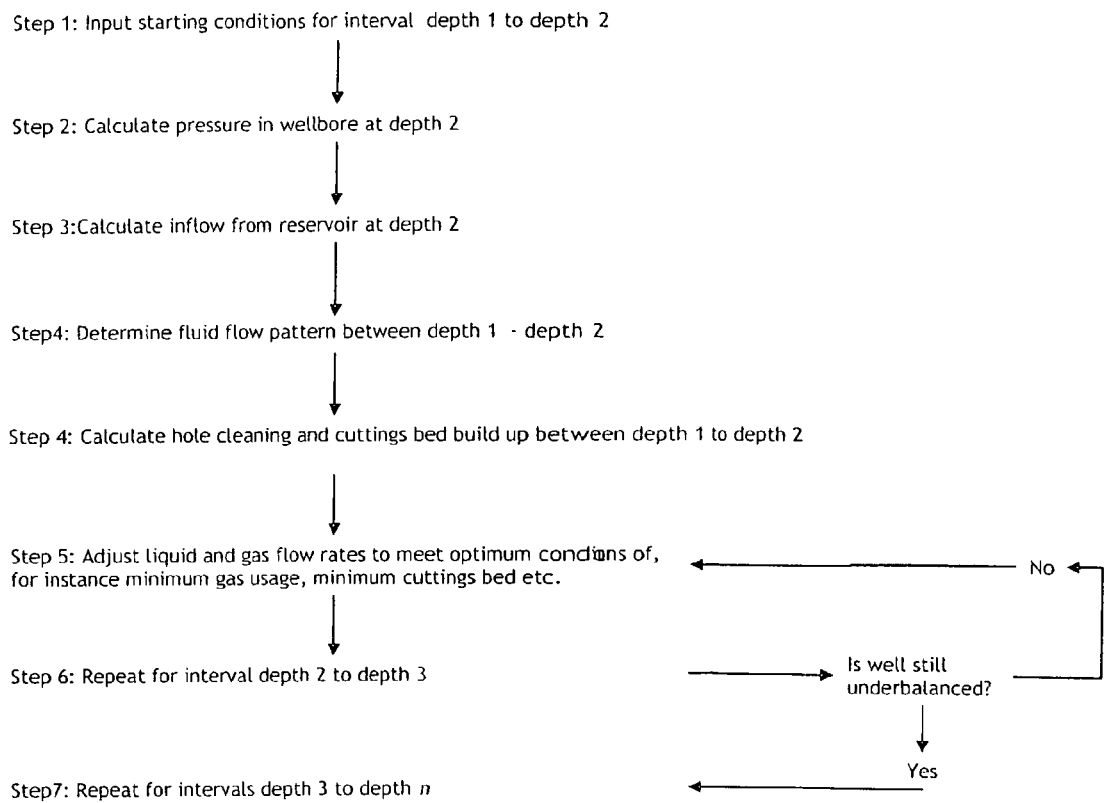
FIG. 3 illustrates the method applied to underbalanced well design.

In the virtual well engineer method the well would be drilled within the virtual reality environment (here referred to as the graphical user interface GUI). The well depth can be increased in increments and the pressure and flow regimes displayed visually on the GUI. At each increment of depth flow conditions such as flow rate of liquid phase and flow rate of gas phase can be adjusted through manipulation of icons, bars or some other representation in the GUI and the results in terms of for instance, flow regime, pressure profile, inflow performance, cuttings cleaning, cuttings bed movement and so on displayed visually and concurrently. The full set of conditions and results are displayed in this virtual reality. At each increment of depth input conditions can be varied to achieve an optimum operating condition (FIG. 3). These simulated conditions can then be used to develop an along hole operating envelope and a set of operating procedures.

Risks, such as stuck pipe due to poor hole cleaning can be simulated and reconciled through the virtual reality system and form part of the risk mitigation processes within the operating procedures.

As a further refinement, the virtual reality GUI can use simple display methods to demonstrate the degree of system optimisation. This could be in the form of, for instance a series of traffic lights with each set of traffic lights representing one aspect of the design process and its relationship with all other linked processes. As each process is optimised the traffic lights change state from red to green. The system is optimised when the maximum number of green lights is displayed. An alternative method might be the use of cross referencing matrices which change colour as the desired optimum state is reached.

This system can be set up to automatically determine the optimum condition given a set of initial constraints or conditions. Methods such as fuzzy logic or constraint satisfaction can be used.

As a further refinement the system can include a risked based economic model which can be used to determine the cost effectiveness of operating decisions.

Figure 4:
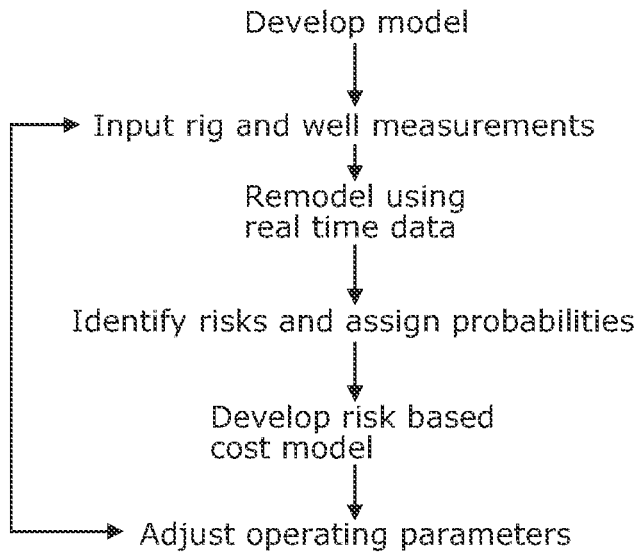
FIG. 4 is an overview of a second embodiment of the invention, applied to the design and real-time control of a drilling process.

A second embodiment of the invention relates to a method of controlling well drilling operations by the use of a real time simulator. As shown in FIG. 4, the simulator constructs a model of the predicted wellbore conditions using, in the first instance input data from the user. The output gives a theoretical model of the drilling program.

Well site sensors are linked to the simulator, with the simulator being located at the rig site or remotely with communication between the simulator and rig site. These sensors will include surface sensors and downhole sensors to include, for instance, pump flow rate, surface pressure, downhole pressure, weight on bit and so on.

As the well is drilled real time data from the sensors is taken by the simulator and the model recalculated to compare actual drilling conditions with the predicted model and to give a model of conditions to be encountered as drilling progresses.

Variances between actual conditions and the predicted model can be used to improve system performance or improve the model on which future predictions of performance are based. The drilling process becomes a learning process.

Figure 5:
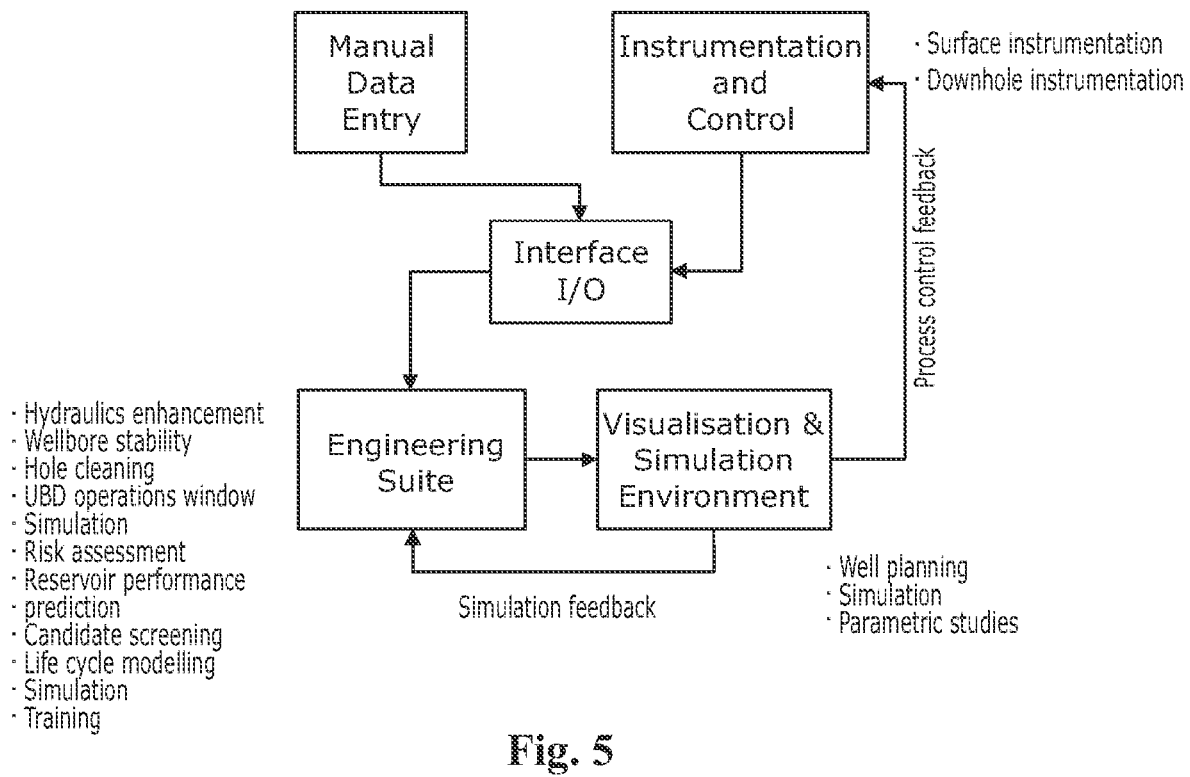
FIG. 5 shows the basic control system layout for the process of FIG. 4.

The basic control system layout is shown in FIG. 5.

The process model is one of:
1. Model well using simulator
2. Receive well and rig measurements
3. Adjust model or adjust drilling parameters
4. Develop new model
5. Continue The simulator displays the model and actual conditions in a virtual reality representation of the data. Thus the operator can see the influences of each operating condition on all relevant aspects of the process. As an example the simulator will display torque and drag (friction) along the drillpipe and also display, for instance cuttings bed build up along the wellbore. The actual torque and drag data can be used to remodel hole cleaning. From this the operating conditions of flow rate and drill string RPM can be adjusted to reduce the depth of the cuttings bed and decrease torque and drag.

As a further refinement the simulator can be linked into a risk based economic model that computes the cost of various operational choices as presented by the model and comparison with real time data. For instance, rate of penetration and hole cleaning are linked. The faster the rate of penetration the more drill cuttings there are to be removed from the well. The model will be able to determine the probability of events such as stuck pipe given the rate of penetration, cuttings bed build up and so on. A risked economic decision can be made to determine whether rate of penetration should be maintained or reduced so as to reduce the likelihood of getting stuck.

Figure 6:
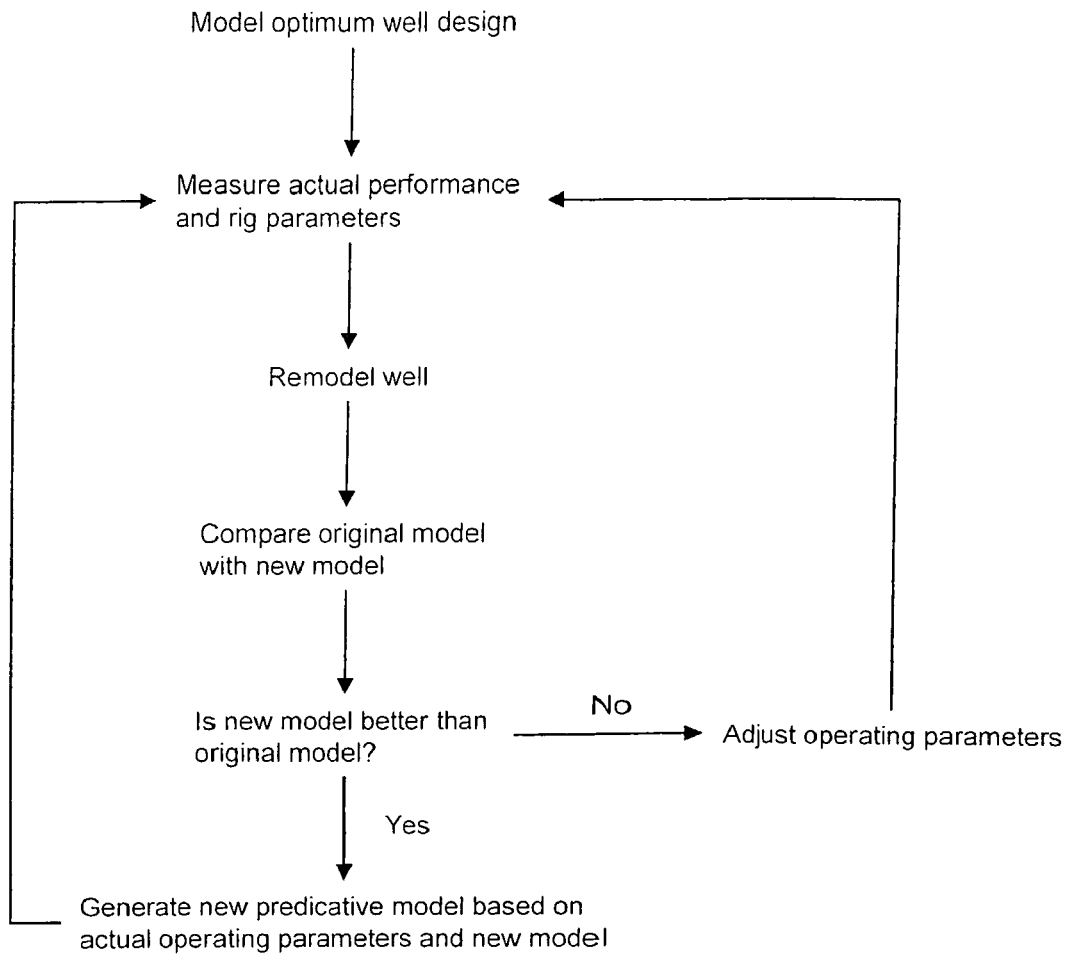
FIG. 6 is a flow diagram of a further embodiment.

Referring now to FIG. 6, the operation of a virtual reality simulator is demonstrated Any number of design parameters is entered into the model. These design parameters can be entered into the model by:
  Manual data entry
  From real time rig and downhole sensors
  From a data library
  As an output from one or more engineering algorithms within the simulator
  As an output from one or more engineering algorithms from a remote simulator or other engineering algorithm
  By manipulation of icons and graphics on the virtual reality user interface An initial model is developed using data entry from one or more of the means above. The model complexity is developed as data is entered into the simulator.

Any design parameter used in more than one related or unrelated engineering algorithm is concurrently used in these engineering algorithms. For example fluid flow rate is used in pressure algorithms, hole cleaning algorithms, equipment performance algorithms and so on. Conventionally, using flow rate as an example, the engineer would have to call on the flow rate data three times—once to calculate flow rate, again to calculate hole cleaning and again to calculate equipment performance. Because the engineer has to consciously call on the data each time there is the potential that the update flow rate, in this example is not called on to recompute one or more of the algorithms.

By linking each design parameter to every engineering algorithm that uses each design algorithm all related algorithms are updated concurrently. Thus changing one design parameter affects the entire well design and not just a single aspect of the well design.

If we now need to simulate the effects of changing a number of design parameters at the same time the whole system effects all the changes in design parameter will be seen. Thus the positive and negative effects of a range of design parameter changes can be seen concurrently.

By having the total well design represented in virtual reality the effects of the design change can be readily and easily seen as a virtual reality image of the well and near wellbore.

FIG. 6 shows the steps in the real time simulation model. This process differs significantly from that described in U.S. Pat. No. 4,794,534. The main difference is that the comparison of performance against model is automatic and does not rely on any interpretation of a negative variance in performance. On the contrary any positive variance in performance is used in the predictive model to optimise future performance.

A further example of the invention will now be described.

The above embodiments describe developing the well plan within a set of constraints and conditions. In the present example, the theoretical maximum depth that can be drilled is determined from user inputs and from computed results derived from user inputs. This is the unconstrained case. There is then calculated a theoretical maximum well depth based on a set of user defined constraints. A further theoretical well depth is then calculated based on a further set of user defined constraints, where the first set of constraints and the second set of constraints are independent constraints. For example, the first set of constraints may be related to geological or reservoir conditions, and the second set to surface facility conditions.

The well planner is then able to see:
the absolute maximum possible
the maximum within geological constraints, which can then be manipulated as necessary
the maximum within facility constraints, which can also be manipulated.

By adding an economic model the well planner can then see the costs incurred and benefits accrued if action were taken to remove or adjust the constraints.

For instance, a common constraint in underbalanced drilling is the available supply of injection gas. If more gas could be found, or logistics arrangements made to supply more gas, then a longer well could be drilled. The production benefit of the extra well length can be compared with the additional cost of the extra gas supply or the logistics, and an economic decision made.

TABLE 1

| Step | Activity | Constraint | Iteration |
|---|---|---|---|
| 1 | Well path | Geological data | Optimisation 1 |
|  |  | Reservoir/target data | Optimisation 3 |
|  |  | Other well paths | Optimisation 6 |
|  |  | Maximum allowable dog leg | Optimisation 9 |
| 2 | Casing design-geometric/biaxial | Geological data | Optimisation 2 |
|  |  | Reservoir data | Optimisation 4 |
|  |  | Maximum dogleg | Optimisation 10 |
| 3 | Casing design-dynamic/triaxial | Maximum allowable tensile load | Optimisation 5 |
|  |  | Maximum allowable torsional load | Optimisation 7 |
|  |  | Minimise axial load (drag) | Optimisation 11 |
| 4. | Drill string design | Maximum allowable torsional load | Optimisation 8 |
|  |  | Maximum allowable tensile load | Optimisation 12 |
|  |  | Minimise axial load (drag) | Optimisation 15 |
| 5 | Hydraulics | Maximum allowable pressure | Optimisation 13 |
|  |  | Minimum annular velocity | Optimisation 16 |
|  |  | Minimum cuttings bed | Optimisation 18 |
|  |  | Optimum bit hydraulics |  |
| 6 | Wellbore stability | Minimum wash out | Optimisation 17 |

The invention claimed is:

1. A computer-implemented method of designing an oil well, comprising:
    (a) defining a plurality of design parameters each of which is determined by a number of input data, the input data for at least some of the parameters including one or more of the other parameters;
    (b) providing, for each of the design parameters, conditions or constraints which must be met;
    (c) using a microprocessor, selecting input data for a first design parameter such that the parameter falls within the conditions or constraints;
    (d) using a microprocessor, varying the input data for the first design parameter to achieve an initial optimisation of the parameter;
    (e) using a microprocessor, for a second design parameter whose input data includes the first parameter, selecting other input data such that the second parameter falls within the conditions or constraints;
    (f) using a microprocessor, varying said other input data for the second design parameter to achieve an initial optimisation of the parameter;
    (g) using a microprocessor, varying the input data for the first parameter to further optimise the second parameter; and
    (h) repeating steps (e) to (g) for the remaining design parameters,
    wherein the design parameters fall within the conditions or constraints to be met for designing an oil well.

2. A computer-implemented method according to claim 1, in which the design parameters are selected from the group consisting of:
    (a) designing a well path from the surface to and through a reservoir;
    (b) designing a casing scheme for a placement, size and material characteristics of a casing cemented in a well;
    (c) designing a drill string, bottom hole assembly and drill bit selection for each section of a well;
    (d) calculating static and dynamic frictional drag in the well bore due to movement of a casing and/or drill string during rotary operations;
    (e) designing a drilling fluid and determination of its rheological properties;
    (f) designing a drilling fluid, flow rate, flow regime and pressure regime along a drill string, through a bit and along an annulus;
    (g) managing pressure in a wellbore and a balance between wellbore pressure, formation fluid pressure and formation fracture pressure.

3. A system for use in oil well design, comprising:
    a database storing a plurality of design parameters each of which is determined by a number of input data, the input data for at least some of the parameters including one or more other parameters;
    the database also storing for each parameter conditions or constraints which must be met;
    means for selecting input data for each of the parameters;
    a calculating module for calculating a selected parameter from its input data; and
    an optimising module for optimising a given parameter by altering the input data of another parameter which forms an input to said given parameter,
    wherein the design parameters provided by the system are for an oil well design, such that the design parameters fall within the conditions or constraints to be met.

4. The system of claim 3, in which the means for selecting input data comprises a manual input device such as a keyboard.

5. The system of claim 3, in which the means for selecting input data comprises an input data database from which items may be selected by a user.

6. The system of claim 3, further comprising a graphical user interface adapted to present the design parameters to the user.

7. The system of claim 6, in which the graphical user interface is adapted to display the degree of system optimisation.

8. The system of claim 7, in which the degree of system optimisation is displayed by a system of traffic light displays.

9. The system of claim 6, in which the graphical user interface comprises a virtual reality interface or view.

* * * * *